US 6,739,749 B2

(12) United States Patent  (10) Patent No.: US 6,739,749 B2
Hsiao                      (45) Date of Patent:     May 25, 2004

(54) THERMOMETRIC NURSING BOTTLE

(76) Inventor: Ming Tun Hsiao, No. 7, Tu Cheng Nan Rd., Tu Cheng Village, Wai Pu Hsiang, Taichung Hsien (TW)

( * ) Notice: Subject to any disclaimer, the term of this patent is extended or adjusted under 35 U.S.C. 154(b) by 0 days.

(21) Appl. No.: 10/396,449

(22) Filed: Mar. 26, 2003

(65) Prior Publication Data

US 2003/0185277 A1 Oct. 2, 2003

Related U.S. Application Data

(63) Continuation-in-part of application No. 10/015,770, filed on Dec. 17, 2001, now abandoned.

(51) Int. Cl.[7] .......................... G01K 1/14; G01K 13/00
(52) U.S. Cl. ................. 374/150; 374/208; 374/120; 215/11.2
(58) Field of Search .......................... 374/150, 151, 374/120, 208; 215/11.1, 11.2, 386

(56) References Cited

U.S. PATENT DOCUMENTS

| 4,930,902 A | * | 6/1990 | Yata et al. ............ 374/150 |
| 5,000,581 A | * | 3/1991 | Yata et al. ............ 374/150 |
| 5,586,085 A | * | 12/1996 | Lichte ................. 367/99 |
| 5,743,647 A | * | 4/1998 | Chen .................. 374/151 |
| 5,782,561 A | * | 7/1998 | Pai ................... 374/151 |
| 2002/0104815 A1 | * | 8/2002 | Richards ............... 215/11.1 |

* cited by examiner

Primary Examiner—Diego Gutierrez
Assistant Examiner—Yaritza Guadalupe
(74) Attorney, Agent, or Firm—Rosenberg, Klein & Lee

(57) ABSTRACT

A thermometric nursing bottle includes a body having a chamber defined for containing liquid. An opening is defined in the bottom of the body and a loop is attached to the bottom of the body and having a threaded section formed on a periphery of the loop. A seal is made of resilient material and mounted within the opening and has a seam defined in the seal. The seam is closed due to an elasticity of the seal. A thermometric device has a skirt upwardly extending form the thermometric device and having a threaded inner periphery such that the thermometric device can be screwed onto the threaded section of the loop. A thermometric sensor upwardly extends from the thermometric device and extends through the seal via the seam into the chamber for sensing a temperature of the liquid in the body.

5 Claims, 4 Drawing Sheets

US 6,739,749 B2

THERMOMETRIC NURSING BOTTLE

CROSS-REFERENCE TO RELATED APPLICATION

The application is a Continuation-In-Part of Ser. No. 10/015,770, filed Dec. 17, 2001, and entitled "THERMOMETRIC NURSING BOTTLE", now abandoned.

BACKGROUND OF THE INVENTION

1. Field of the Invention

The present invention relates to a nursing bottle, and more particularly to a thermometric nursing bottle that has a seal to prevent the liquid in the thermometric nursing bottle from leaking when attaching/detaching the thermometric device to/from the thermometric nursing bottle.

2. Description of Related Art

A conventional thermometric nursing bottle in accordance with the prior art shown in FIG. 5, comprises a body (81) having an open bottom and a connecting portion (82) inwardly radially extending from an inner periphery of the open bottom of the body (81). A base plate (83) is securely attached to the connecting portion (82) of the body (81). The base plate (83) has a threaded portion (831) formed on a periphery of the base plate (83) and an opening (832) centrally defined in the base plate (83).

A thermometric device (9) is mounted on the bottom of the body (81). The thermometric device (9) has a skirt (91) with a threaded inner periphery corresponding to the threaded section (831) of the base plate (83) such that the thermometric device (9) can be screwed onto the threaded section (831) of the base plate (83). The thermometric device (9) has a protrusion (92) centrally extending from the thermometric device (9) and corresponding to the opening (832) in the base plate (83). The thermometric device (9) has a thermometric sensor (94) electrically connected to a circuit (not shown) in the thermometric device (9) and extends through the protrusion (92). An o-ring (93) is mounted around the protrusion (92) and partially received in the protrusion (92). The thermometric sensor (94) is contained in the body (81) and the base plate (83) securely abuts the o-ring (93) to seal the opening (832) when the thermometric device (9) is mounted to the bottom of the body (81).

With reference to FIG. 6, the base plate (83) of the above nursing bottle has an opening (832). Consequently, the body (81) loses the containing function and the remnants liquid flows out of the body (81) through the opening (832) when the thermometric device (9) is detached from the body (81).

The conventional nursing bottle has two locations may cause a leak, one between the connecting portion (82) and the base plate (83), and the other between the opening (832) and the protrusion (92). However, the leak between the opening (832) and the protrusion (92) is easily solved by the o-ring (93). As usually, the connecting portion (82) and the base plate (83) are secured to each other by ultrasonic waves welding. The ultrasonic waves welding can provide a good strength to the structure, but cannot effectively seal the seam between the connecting portion (82) and the base plate (83). It will take a lot of manufacturing cost for a good sealing effect between the connecting portion (82) and the base plate (83) by ultrasonic waves welding. Consequently, the structure of the conventional thermometric nursing bottle needs to be advantageously altered.

The present invention has arisen to mitigate and/or obviate the disadvantages of the conventional thermometric nursing bottle.

SUMMARY OF THE INVENTION

The main objective of the present invention is to provide an improved thermometric nursing bottle that has a seal to prevent the liquid in the thermometric nursing bottle from leaking when attaching/detaching the thermometric device to/from the thermometric nursing bottle.

To achieve the objective, the thermometric nursing bottle in accordance with the present invention comprises a body having a chamber defined for containing liquid. An opening is defined in the bottom of the body, and a loop is attached to the bottom of the body and having a threaded section formed on a periphery of the loop. A seal is made of resilient material and mounted within the opening and has a seam defined in the seal. The seam is closed due to an elasticity of the seal. A thermometric device has a skirt upwardly extending form the thermometric device and having a threaded inner periphery such that the thermometric device can be screwed onto the threaded section of the loop. A thermometric sensor upwardly extends from the thermometric device and extends through the seal via the seam into the chamber for sensing a temperature of the liquid in the body.

Further benefits and advantages of the present invention will become apparent after a careful reading of the detailed description with appropriate reference to the accompanying drawings.

DETAILED DESCRIPTION OF THE INVENTION

Figure 1:
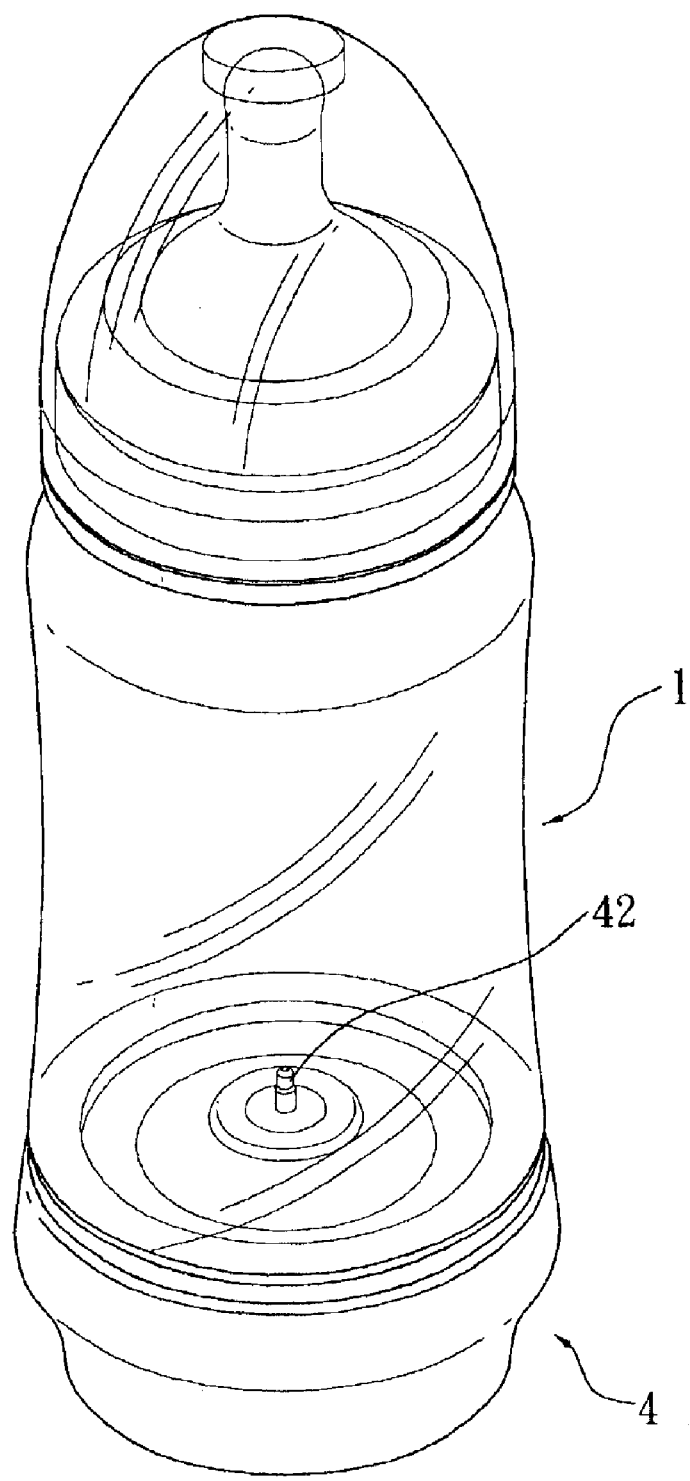
FIG. 1 is a perspective view of a thermometric nursing bottle in accordance with the present invention.
Figure 2:
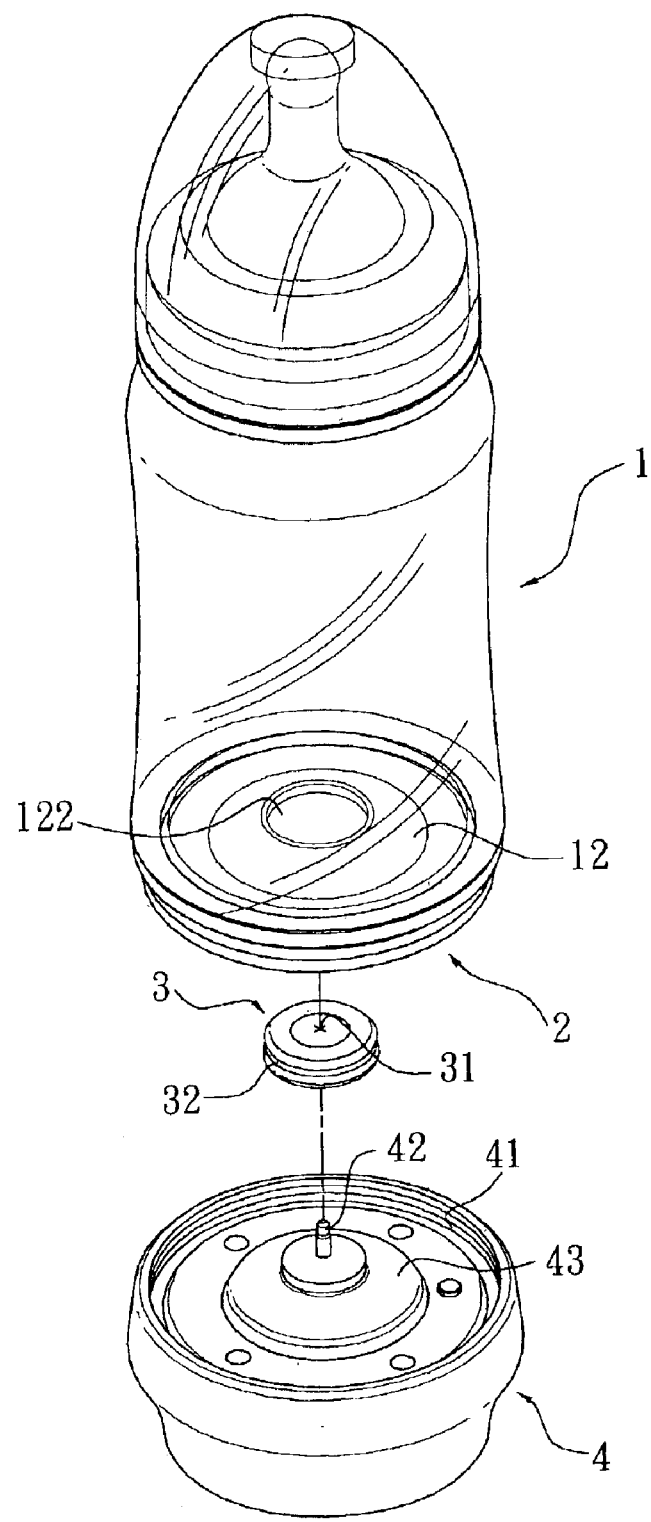
FIG. 2 is a partially exploded perspective view of the thermometric nursing bottle in FIG. 1.
Figure 3:
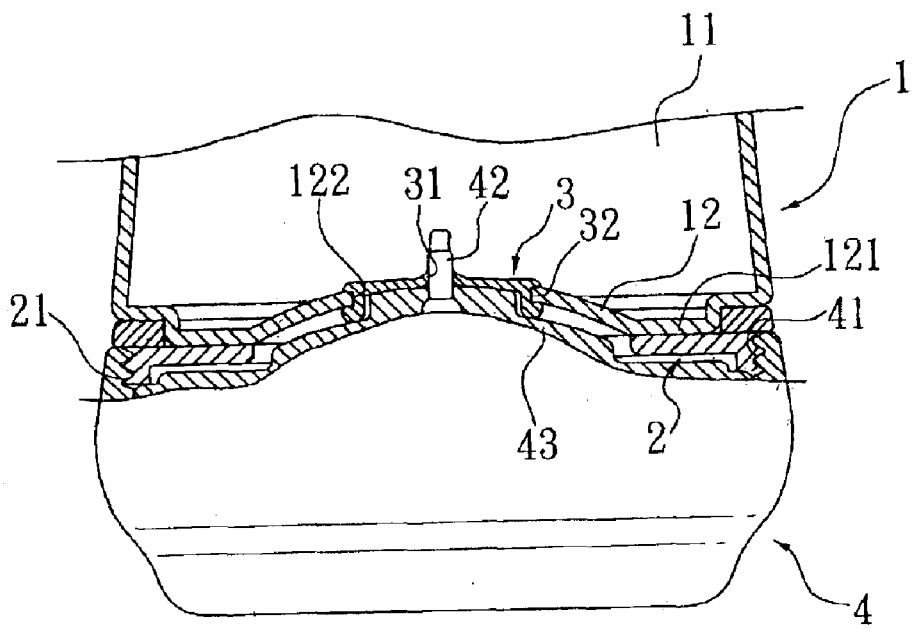
FIG. 3 is a partially cross sectional plan view of the thermometric nursing bottle in FIG. 1.

Referring to the drawings and initially to FIGS. 1, 2 and 3, a thermometric nursing bottle in accordance with the present invention comprises a body (1), a loop (2) securely attached to a bottom (12) of the body (1), a seal (3) mounted in the bottom (12) of the body (1) and a thermometric device (4) mounted to the loop (3) and abutting the seat (3) in the bottom of the body (1).

The body (1) includes a chamber (11) defined for containing liquid in the body (1). A flat (121) is formed on the bottom (12) of the body (1) and an opening (122) is centrally defined in the bottom (12) of the body (1).

The loop (2) has a threaded section (21) formed on a periphery of the loop (2). In the preferred embodiment of the present invention, the loop (2) is attached to the flat (121) of the bottom (12) of the body (1) by ultrasonic waves welding.

The seal (3) is made of resilient material, such as silica gel or the like. The seal (3) is mounted within the opening (122) in the bottom (12) of the body (1) for closing the opening (122). A seam (31) is defined in the seal (3). In the preferred embodiment of the present invention, the seal (31) has a cross shape. In an original condition, the seam (31) is closed due to the elasticity of the seal (3). The seal (3) has an annular groove (32) defined in a periphery of the seal (23) for receiving a periphery of the opening (122) in the bottom (12) of the body (1) and securely closing the opening (122) when the seal (3) is mounted within the opening (122).

The thermometric device (4) has a skirt (41) upwardly extending therefrom. The skirt (41) has a threaded inner periphery such that the thermometric device (4) can be screwed onto the threaded section (21) of the loop (2) that is securely attached to the bottom (12) of the body (1). The thermometric device (4) has a thermometric sensor (42) upwardly extending therefrom and corresponding to the seam (31) in the seal (3). The thermometric sensor (42) extends through the seam (31) into the chamber (11) to sense the temperature of the liquid in the chamber (11) in the body (1) when the thermometric device (4) is screwed onto the loop (2). The thermometric device (4) includes a raised portion (43) extending from the thermometric device (4) and corresponding to the seal (3). The raised portion (43) securely abuts the seal (3) when the thermometric device (4) is screwed onto the loop (2) to ensure the seal (3) closing the opening (122) in the bottom (12) of the body (1).

Figure 4:
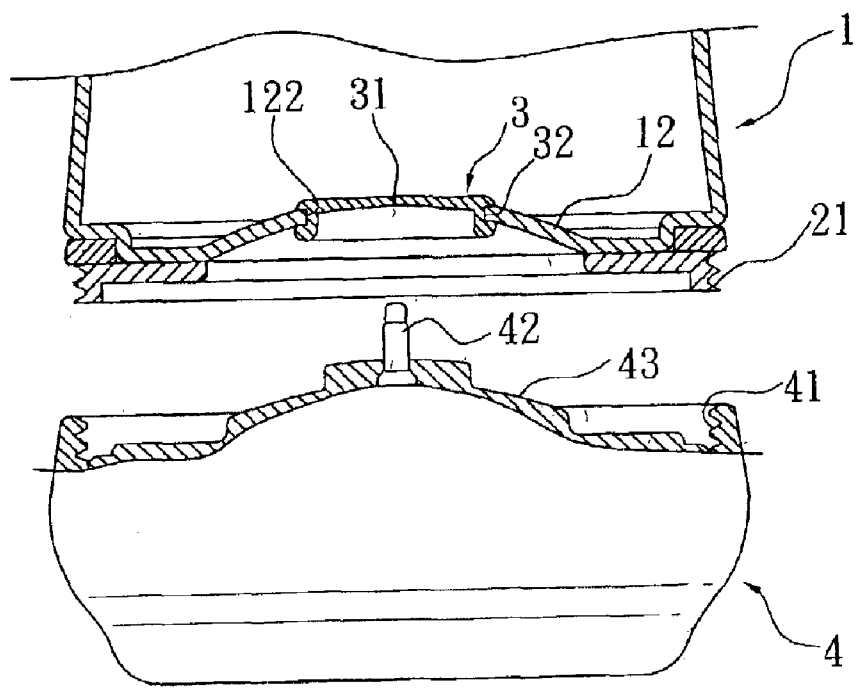
FIG. 4 is a partially exploded plan view of the thermometric nursing bottle in FIG. 1.
Figure 5:
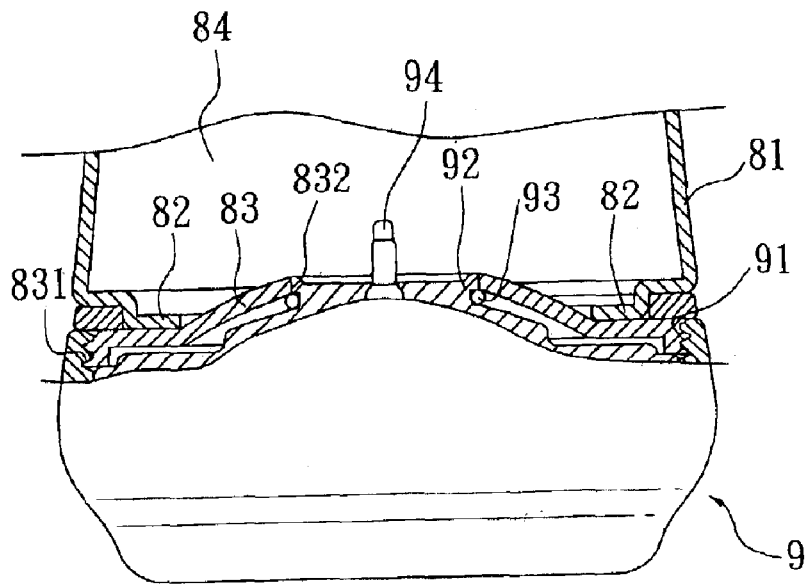
FIG. 5 is partially cross sectional plan view of a conventional thermometric nursing bottle in accordance with the prior art.
Figure 6:
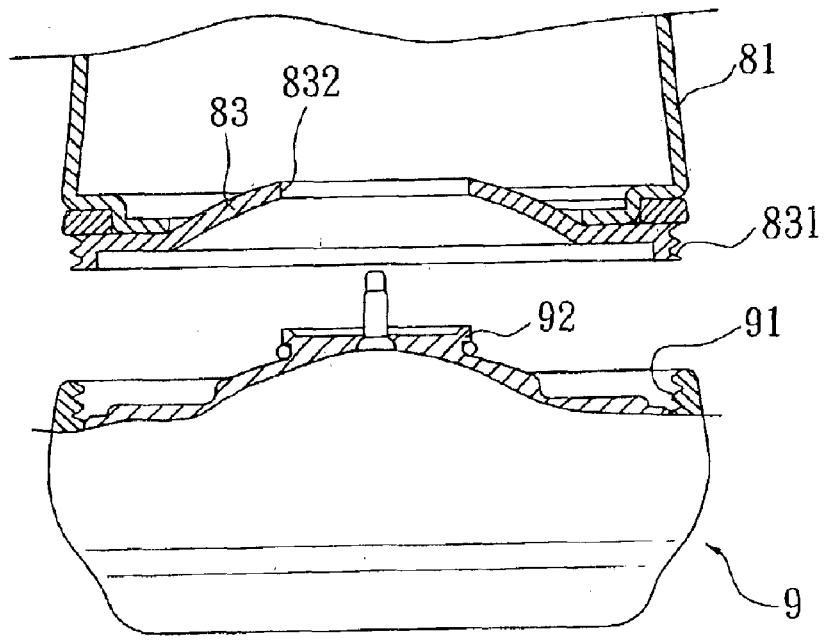
FIG. 6 is a partially exploded plan view of the thermometric nursing bottle in FIG. 5.

With reference to FIGS. 3 and 4, the seam (31) is closed due to the elasticity of the seal (3) because the seal (3) is made of resilient material. Consequently, the body (1) in accordance with the present invention can contain liquid by itself when the thermometric device (4) is detached from the loop (2) that is secured on the bottom of the body (1).

Furthermore, the raised portion (43) securely abuts the seal (3) such that a good sealing effect is provided to the seal (3) and the bottom (12) of the body (1). The seam (31) is closed due to the elasticity of the seal (3) such that the seam (31) still be closed even the thermometric sensor (42) extending through the seal (3) in the chamber (11) in the body (1) via the seam (3).

As described above, the seal (3) of the present invention is provided to prevent the liquid in the thermometric nursing bottle from leaking when attaching/detaching the thermometric device to/from the thermometric nursing bottle.

Although the invention has been explained in relation to its preferred embodiment, it is to be understood that many other possible modifications and variations can be made without departing from the spirit and scope of the invention as hereinafter claimed.

What is claimed is:

1. A thermometric nursing bottle comprising:

a body including:
   a chamber defined in the body for containing liquid;
   a flat formed on a bottom of the body; and
   an opening defined in the bottom of the body;

a loop securely attached to the flat of the body and having a threaded section formed on a periphery of the loop;

a seal made of resilient material and mounted within the opening in the bottom of the body, the seal having a seam defined therein, the seam being closed due to an elasticity of the seal; and a thermometric device mounted to the loop, the thermometric device including:
   a skirt upwardly extending from the thermometric device and having a threaded inner periphery such that the thermometric device can be screwed onto the threaded section of the loop; and
   a thermometric sensor upwardly extending from the thermometric device, the thermometric sensor extending through the seal via the seam and into the chamber for sensing a temperature of the liquid in the body when the thermometric device is mounted to the loop.

2. The thermometric nursing bottle as claimed in claim 1, wherein the loop is securely attached by ultrasonic waves welding.

3. The thermometric nursing bottle as claimed in claim 1, wherein the seal comprises an annular groove defined in a periphery of the seal for receiving a periphery of the opening in the bottom of the body and securely closing the opening when the seal is mounted within the opening.

4. The thermometric nursing bottle as claimed in claim 1, wherein the thermometric device comprises a raised portion extending there from and corresponding to the seal the raised portion securely abutting the seal when the thermometric device is mounted to the loop to ensure the seal closing the opening in the bottom of the body.

5. The thermometric nursing bottle as claimed in claim 1, wherein the seam in the seal has a cross shape.

\* \* \* \* \*